United States Patent [19]

Keller et al.

[11] 4,029,622

[45] June 14, 1977

[54] NON-AQUEOUS POLYMER DISPERSIONS OF WATER-SOLUBLE MONOMERS

[75] Inventors: Wilfried Keller, Opladen; Friedhelm Müller, Odenthal, both of Germany

[73] Assignee: Bayer Aktiengesellschaft, Germany

[22] Filed: Apr. 21, 1975

[21] Appl. No.: 570,185

[30] Foreign Application Priority Data

Apr. 24, 1974 Germany .......................... 2419764

[52] U.S. Cl. ........................................ 260/29.6 WQ
[51] Int. Cl.² ............................................. C08L 33/26
[58] Field of Search ............ 260/29.6 WQ, 31.2 N, 260/29.6 HN, 80 M

[56] References Cited

UNITED STATES PATENTS

| | | | |
|---|---|---|---|
| 2,982,749 | 5/1961 | Friedrich et al. | 260/29.6 WQ |
| 3,258,453 | 6/1966 | Chi | 260/80 M |
| 3,278,506 | 10/1966 | Chamot et al. | 260/89.7 R |
| 3,284,393 | 11/1966 | Vanderhoff et al. | 260/29.6 WQ |
| 3,507,840 | 4/1970 | Hurlock | 260/80 M |
| 3,826,771 | 7/1974 | Anderson et al. | 260/29.6 H |

*Primary Examiner*—M. J. Welsh
*Attorney, Agent, or Firm*—Connolly and Hutz

[57] ABSTRACT

Stable non-aqueous dispersion of water-soluble polymers of extremely high molecular weight coupled with relatively low viscosity and rapid dilutability with water to form a polymer solution are obtained by polymerization of at least one water-soluble $\alpha,\beta$-monoolefinically unsaturated monomer such as acrylamide and dimethyl aminoethyl methacrylate in water-in-oil emulsion with the aid of at least one photo-initiator and UV-light, and azeotropical distillation from water, before or after the addition of a water-soluble wetting agent, to a residual water content of less than 5% by weight, based on polymer. The dispersions are eminently suitable for the preparation of aqueous solution, as retention agents for fillers and water-removal accelerators in the production of paper.

1 Claim, No Drawings

NON-AQUEOUS POLYMER DISPERSIONS OF WATER-SOLUBLE MONOMERS

This invention relates to stable, non-aqueous dispersions of water-soluble polymers of extremely high molecular weight, and to their rapid dissolution in water.

U.S. Pat. No. 3,282,874 relates to an improved process for dissolving preformed, solid water-soluble polymers in water. In this process, polymer powders are dispersed in an inert organic liquid immiscible with water and the resulting dispersion is subsequently diluted with more water to form a polymer solution. One disadvantage of this process is that, before dispersion, the preformed polymers have to be reduced to the requisite particle size by grinding.

In addition, German Offenlegungsschrift No. 2,154,081 relates to a process for rapidly dissolving high molecular weight, water-soluble vinly addition polymers and rubbers in water, distinguished by the fact that a water-in-oil emulsion (W/O-emulsion) containing a water-soluble polymer is prepared. Before the polymer is introduced into the W/O-emulsion, it has to be size-reduced by a complicated process, such as grinding or similar measures, so that its average grain size is less than 5 mm, but is preferably in the range of from 1 to 5 $\mu$m.

Unfortunately, this process does not give a stable emulsion material. In other words the polymer-containing W/O-emulsion separates on its own in the event of prolonged standing and, for this reason, has to be kept homogeneous by repeated mixing.

The polymer-containing W/O-emulsions of German Offenlegungsschrift No. 2,154,081 can be reversed into an aqueous polymer solution by being mixed with water which contains a wetting agent in solution in order to accelerate liberation of the polymer from the W/O-emulsion. Providing special precautionary measures are taken, the water-soluble wetting agent may also be directly introduced into the polymer-containing W/O-emulsion. Mixtures of this kind are then able to reverse on their own when stirred into water, changing into an aqueous polymer solution. By virtue of the fact that they are easy to handle, the one-component systems prepared in this way have considerably advantages, in terms of application, over two-component systems, in whose case the aqueous solution of the water-soluble wetting agent first has to be prepared and the polymer-containing W/O-emulsion subsequently stirred into it. Unfortunately, one-component systems suffer from the significant disadvantage that, in many cases, they do not remain stable in storage over prolonged periods, because the water-soluble wetting agents added to them are able to destroy the one-component system to a certan extent before it is used on account of their tendency to react with the W/O-emulsion or the W/O-emulsifier.

Thus, it is frequently found that systems of this kind undergo undesirable separation after prolonged standing. In many cases, coagulate formation is caused by dripping water of condensation when, as is common practice, the products have to be transported and stored in closed drums or tanks at different temperatures. Under adverse conditions, one-component systems can even stick together to form a single lump of gel through self-inversion, self-inversion being the destructive interaction between the added water-soluble wetting agent and the constituents of the emulsion.

Finally, it is also known that polymer-containing W/O-emulsions can be prepared from water-soluble vinyl monomers by polymerisation in reverse emulsion. To this end, aqueous monomer solutions in an inert hydrocarbon are emulsified by means of a W/O-emulsifier and the resulting emulsion heated in the presence of a catalytic quantity of a peroxide catalyst. Although it is possible in this way to obtain a very fine-particle polymer, the polymers prepared in this way are of relatively low molecular weight by comparison with polymers obtained from aqueous solution and, in many cases, do not reach the extremely high molecular weights required for most practical application (cf. German Patent Specification No. 1,089,173).

Our own co-pending U.S. Pat. application Ser. No. 517,214, filed Oct. 23, 1974 relates to a process for the production of extremely high molecular weight water-soluble polymers in the form of stable W/O-emulsion by polymerising at least one water-insoluble $\alpha,\beta$-monoolefinically unsaturated monomer in a W/O-emulsion, distinguished by the fact that polymerisation is initiated by means of a photoinitiator soluble in the water or oil phase and UV-light.

The object of the present invention is to convert the high molecular weight water-soluble polymers prepared in the form of a W/O-emulsion in accordance with our co-pending U.S. Pat. application Ser. No. 517,214 into a stable and, hence, indefinitely storable one-component system which may rapidly be converted into an aqueous solution of the polymer by the addition of water.

According to the invention, this object is achieved by virtue of the fact that the polymer-containing W/O-emulsions obtained in accordance with U.S. Pat. application Ser. No. 517,214 are converted by the removal of water into extremely stable non-aqueous polymer dispersions with an average polymer particle size of from 0.01 to 1 $\mu$, and are mixed with a water-soluble wetting agent before or after the water-removing step in order to improve redissolution of the dispersed particles in water.

Accordingly, the present invention relates to non-aqueous dispersions of high molecular weight, water-soluble polymers with an average polymer particle size of from 0.01 to 1 $\mu$ and extremely high mechanical strength and stability in storage, distinguished by the fact that the polymers have been obtained by the polymerisation of at least one water-soluble, $\alpha$, $\beta$-monoolefinically unsaturated monomer in a W/O-emulsion by means of at least one photoinitiator and UV-light, and have been azetropically freed from water, before or after the addition of a water-soluble wetting agent, to a residual water content of less than 5% by weight, based on polymer.

The invention also relates to a process for the production of aqueous solutions of high molecular weight, water-soluble polymers from non-aqueous dispersions, distinguished by the fact that high molecular weight, water-soluble polymers which have been obtained by the polymerisation of at least one water-soluble monomer in a W/O-emulsion by means of at least one photoinitiator and UV-light, are azeotropically freed from water, before or after the addition of a water-soluble wetting agent, to a residual water content of less than 5% by weight, based on polymer, and the resulting, stable, storable dispersions of the polymer with an average particle size of from 0.01 to 1 $\mu$ are mixed with water either directly or at a later stage to form aqueous solutions of the polymer.

It was surprising that, in contrast to the disclosure of U.S. Pat. No. 3,507,840 (cf. column 2, lines 30 to 40), according to which water-soluble polymers which have been azeotropically freed from water lose a considerable proportion of their original activity unless the measures described there (the addition of special salts) are applied, the polymers in the dispersions according to the invention retain their full polymer activity, even after the removal of water. It has also been found that, despite the increasing concentration of polymer, the viscosity of the polymer dispersion is distinctly reduced during the removal of water.

In addition, the water-free polymer dispersions are extremely stable and do not show any sedimentation, even after storage for several months. In addition to excellent stability and storage, they also show an extremely high resistance to all water-soluble agents, such as conventional polymer precipitants, for example acetone or lower alcohols, cyclic water-soluble ethers of the dioxan and tetrahydrofuran type, and also water-soluble glycol esters such as methyl or ethyl glycol acetate.

In addition, the dispersions according to the invention show unexpectedly high compatibility with a number of water-soluble wetting agents without losing their original stability.

In mixtures of this kind, the polymer dispersions are hydrophilic in character and, hence, are able to change spontaneously into an aqueous polymer solution when mixed with water.

The water-soluble polymers used in accordance with the invention are obtained in accordance with U.S. Pat. application Ser. No. 517,214 by polymerising at last one water-soluble monomer in a W/O-emulsion by means of at least one photo-initiator and UV-light. In the context of the invention, water-soluble monomers are monomers of the type from which, or from whose salts, it is possible to prepare at least 2 percent by weight solutions in water at $t = 25°$ C.

The following are mentioned as examples of water-soluble compounds:

A. Water-soluble carboxylic acids with 3 to 6 carbon atoms, preferably with 3 or 4 carbon atoms, such as acrylic acid, methacrylic acid, crotonic acid, maleic acid, itaconic acid, citraconic acid, aconitic acid and the alkali metal and ammonium salts of the aforementioned acids, preferably acrylic acid, methacrylic acid and maleic acid.

B. Water-soluble semiesters of dicarboxylic and tricarboxylic acids with 4 to 6 carbon atoms and monohydric aliphatic alcohols with 1 to 8 carbon atoms or their alkali metal and ammonium salts, for example maleic acid semiesters or their alkali metal and ammonium salts.

C. $\alpha$, $\beta$-Monoolefinically unsaturated sulphonic acids such as vinyl sulphonic acid or styrene sulphonic acid.

D. Water-soluble, primary, secondary and tertiary aminoalkyl esters of (meth)acrylic acid with 2 to 4 carbon atoms in the alkyl radical, for example dimethyl aminoethyl(meth)acrylate, diethyl aminoethyl(meth)acrylate, dimethyl aminopropyl(meth)acrylate, dimethyl aminobutyl(meth)acrylate and their salts with inorganic or organic acids such as hydrochloric acid, acetic acid, etc., preferably dimethyl aminoethyl(meth)acrylate.

E. Methacrylamide, acrylamide.

F. Dialkyl aminoalkyl(meth)acrylamides with 1 or 2 carbon atoms in the alkyl amino group and 1 to 4 carbon atoms in the second alkyl group or their salts with inorganic or organic acids such as hydrochloric acid, acetic acid, etc., such as dimethyl aminoethyl(meth)acrylamide.

G. N-methylol(meth)acrylamide and N-alkoxy methyl(meth)acrylamides with 1 or 2 carbon atoms in the alkoxy group, such as N-methoxy methyl(meth)acrylamide. Monomers of groups (A), (D), (E) and (F) or their mixtures are preferably used.

One particularly preferred monomer mixture consists of 90 to 70% by weight of acrylamide and of 10 to 30% by weight of dimethyl aminoethyl methacrylate. The monomers are incorporated into the copolymer in satistical distribution in the same ratio.

The monomers or their salts are used in the form of 20 to 80% by weight aqueous solutions and preferably in the form of 50 to 70% by weight aqueous solutions for the process according to the invention.

Any liquid which does not dissolve the monomers used and which is immiscible with water may be used as the oil phase. It is preferred to use liquid aliphatic and aromatic hydrocarbons or their substitution products and mixtures, such as benzene, toluene, xylene, decalin, tetralin, mineral oils, kerosenes, petroleum, paraffins, isopraraffins, petrol, white spirit, xylene mixtures or mixtures thereof.

The ratio by weight of the oil phase to the monomer-containing aqueous phase may be varied within wide limits, depending upon the monomers used, although it is preferably in the range of from 3:1 to 1:2.5.

The aqueous phase may be emulsified in the oil phase with any known W/O-emulsifiers, usually those with low HLB-values [Hydrophili-Lipophile-Balance (cf. the publication by Atlas Chemical Industries "The Atlas HLB-System" 1963)]. The following W/O-emulsifiers are particularly suitable: sorbitan fatty acid esters such as sorbitan monooleate, stearate, laurate or palmitate; polyoxyethylene-sorbitan fatty acid esters, i.e. reaction products of 1 mol of the aforementioned sorbitan fatty acid esters with from 4 to 40 mols of ethylene oxide; polyoxyethylene sorbitol esters of fatty acids and resinic acids; and mixtures thereof. They are preferably used in quantities of from 5 to 20% by weight, based on the oil phase.

Suitable photoinitiators are the compounds normally used for this purpose, for example benzophenone and, quite generally, aromatic keto compounds derived from benzophenone, such as alkyl benzophenones, halogen-methylated benzophenones according to German Offenlegungsschrift No. 1,949,010, Michler's ketone, anthrone or halogenated benzophenones. It is also possible to use benzoin and its derivatives, for example in accordance with German Offenlegungsschrifts Nos. 1,769,168; 1,769,853; 1,769,854; 1,807,297; 1,807,301; 1,919,678 and German Auslegeschrift No. 1,694,149. Other effective photoinitiators include anthraquinone and many of its derivatives, for example $\beta$-methyl anthraquinone, tert.-butyl anthraquinone and anthraquinone carboxylic acid esters, and also oxime esters according to German Offenlegungsschrift No. 1,795,089.

It is particularly preferred to use benzoin and its alkyl ethers such as, for example, methyl ether, ethyl ether, propyl ether or isopropyl ether; and aromatic acyloins substituted in the $\alpha$-position or their ethers, such as, for example, alkali metal salts of α-propionic acid benzoin ethyl ether.

The photoinitiators are used in concentrations of from 0.005 to 10% by weight and preferably in concentrations of from 0.01 to 0.1% by weight, based on the monomer used. It is possible to use one or more photoinitiators.

The radiation surces used for carrying out the photopolymerisation reaction include artificial light sources with emissions in the range from 1500 to 5000 A and preferably in the range of from 3000 to 4000 A. It is advantageous to use mercury vapor, xenon and tungsten lamps, fluorescent tubes and carbon arc lamps, although sunlight may also be used. It is particularly preferred to use fluorescent tubes.

The process according to the invention may be carried out either continuously or in batches. Normally the aqueous solutions of the monomers are first emulsified under high shear forces in the oil phase which generally contains the W/O-emulsifiers. The photoinitiators used may be present either in the aqueous monomer solution or in the oil phase, depending upon their solubility.

The W/O-emulsion thus obtained is then exposed to light, as a result of which the monomers undergo substantially quantitative polymerisation. The heat of polymerisation may be dissipated either by external cooling or by evaporating part of the oil phase, for example under reflux.

The distance separating the light source from the reaction mixture is governed by the intensity of the light source, by the period of exposure, by the type of initiator used and, where the process is carried out continuously, by the rate of flow of the reaction liquid through the reaction tube. It may be from about 1 cm to 100 cm. The layer thickness of the W/O-emulsion to be polymerised is preferably from 0.5 to about 20 cm, depending upon its permeability to light. The light source or light sources is/are preferably immersed in the polymerisation medium (W/O-emulsion).

The period of exposure to light is governed both by the type and concentration of the monomers used, by the intensity of the light source and by the radiation density, by the thickness of the layer to be polymerised and by the type and quantity of photoinitiators used, and may amount to between a few seconds and several hours, although it is preferably between about 10 minutes and 3 hours.

The polymerisation temperatures may be selected from a wide range. They are preferably in the range of from $-10°$ C. to about $100°$ C. In one particularly preferred embodiment of the invention, polymerisation is carried out at room temperature ($t \sim 20° - 25°$ C.) in the absence of heat.

The concentrations of polymer in the W/O-emulsion may fluctuate within wide limits. The polymer content of the W/O-emulsion is normally from 10 to 50% by weight.

In general, the W/O-emulsions are freed from water by the addition of organic liquids forming azetropic mixtures with water, such as benzene, toluene, heptane, etc., followed by heating to boiling point. The organic liquid used as oil phase is preferably used as the azeotropic water-removing agent. The azeotropic mixture is distilled off, optionally under reduced pressure, and after it has been condensed separates into an aqueous phase and an organic phase. This process is continued until almost all the water has been removed from the polymer. The organic phase can also be returned continuously to the reaction vessel through a water separator.

Azeotropic distillation is carried out at temperatures below $100°$ C, preferably at temperatures in the range of from 50 to $70°$ C, if desired under reduced pressure. The viscosities of the water-free dispersions (the water content should be below 5% by weight, preferably below 3% by weight, based on the polymer) are distinctly lower by comparison with the corresponding W/O-emulsions for the same solids content and the same composition of the oil phase, as can also be seen from the Examples.

Relatively low viscosities for relatively high solids contents and equally good or better handling properties represent a considerable saving both in transportation costs and in transportation space.

Processes for azeotropically removing water from water-containing polymer gels by azeotropic distillation are known per se (cf. DT-OS 2,064,101 and 2,207,795 ).

The linear copolymers in the dispersions according to the invention have average molecular weights of at least 5,000,000.

To prepare the aqueous solutions of the polymers, the dispersions according to the invention, which contain less than 5% by weight of water, based on polymers, may be mixed with water at the place where they are to be used, the dispersions preferably being introduced into water. The aqueous solutions preferably have solids contents of less than 5% by weight. Strictly speaking, the dispersions are converted into oil-in-water emulsions although they appear to the eye as clear solutions. For use as retention agents and water-removal accelerators, the polymer solutions may have solids contents of far less than 1% by weight.

In order to obtain smoother, faster redissolution in water, the dispersions according to the invention may be mixed with water-soluble wetting agents before or after removal of the water.

Preferred water-soluble wetting agents are ethoxylated alkyl and aralkyl phenols with from 8 to 20 carbon atoms in the alkyl and aralkyl radicals, for example nonyl phenols and benzylated 4-hydroxy diphenyl with polyether chain of more than 8, preferably 10 to 20, ethylene oxide units, and condensation products of long-chain ($C_8$–$C_{20}$) fatty alcohols or ($C_{12}$ –$C_{20}$) fatty acids with more than 10, preferably with 20 to 50, ethylene oxide units.

The concentrations of water-soluble wetting agents in the polymer dispersions according to the invention may amount to between 5 and 20% by weight, based on dispersion.

The water-soluble wetting agents may be added both before and also after the removal of water. They are preferably added to the polymer dispersion after the azeotropic removal of water, optionally using from 5 to 20% by weight, based on dispersion, of solution promoters.

Suitable solution promoters include any organic liquids which dissolve the water-soluble wetting agent and which are miscible with the outer phase. Examples of suitable solution promoters are aromatic hydrocarbons, such as benzene, toluene or xylene mixtures; chlorinated hydrocarbons, such as carbon tetrachloride, methylene chloride, chlorobenzene or dichlorobenzene, etc.; higher aliphatic $C_6$–$C_7$ alcohols such as decanol or undecanol; and cycloaliphatic alcohols with 6 to 10 carbon atoms, such as decalin, tetralin or mixtures thereof, preferably higher aliphatic alcohols and cycloaliphatic alcohols.

The combination of the desirable properties of the dispersions according to the invention, such as the high solids content of extremely high molecular weight polymers, coupled with relatively low viscosity, rapid dilutability with water to form a polymer solution and the extremely high stability of the polymer dispersions prepared in accordance with the invention, provides them with outstanding properties in terms of application.

The polymer concentration of the dispersion may vary within wide limits. The polymer content is normally from 10 to 50% by weight and preferably from 30 to 50% by weight, based on the polymer dispersion, and may be increased as required by distilling off more fractions of the oil phase.

The polymers remain in very fine-particle form, preferably with an average particle size of from 0.01 to $1\mu$ in the dispersion and, in this fine-particle form, are eminently suitable for the preparation of aqueous polymer solutions, preferably as retention agents for fillers and water-removal accelerators in the production of paper, and also as sizes for textiles, finishes and thickeners or as protective colloids.

The percentages quoted in the Examples are per cent by weight unless otherwise stated. In each case, viscosity was measured at $t = 20°$ C.

EXAMPLE 1

Preparation of the polymer

Oil phase:
150 g of isoparaffin mixture ($C_9$ to $C_{12}$); bp $_{760}$ : 150°–200° C
25 g of sorbitan monooleate
0.05 g of benzoin isopropyl ether
Aqueous phase:
70 g of acryl amide
30 g of dimethyl amino ethyl methacrylate
35 g of water The pH-value of the aqueous phase was adjusted to pH 6 with 36% hydrochloric acid.

The aqueous phase was emulsified in the oil phase by means of an intensive mixer, resulting in the formation of a stable W/O-emulsion.

Test apparatus

The UV-light source (Philips Fluorescent Tube TL 05/6W) was arranged in a vertically mounted glass tube.

In order more effectively to dissipate the heat of reaction, the reaction vessel was thermostatically controlled from outside by a water jacket and from inside by cooling the UV-light source with water. At the beginning of polymerisation, the temperature of the reaction mixture was 20° C.

Polymerisation: following introduction of the monomer emulsion into the test apparatus, the test apparatus was rinsed with nitrogen for about 30 minutes in order to eliminate traces of oxygen, after which the UV-lamp was switched on. A moderate stream of nitrogen was also maintained during polymerisation.
Reaction time: 30 minutes.

The resulting W/O-emulsion had a polymer content (polymer A) of 33% by weight. Its Brookfield viscosity amounted to 35 cP, whilst the average particle size of the polymer was 0.5 $\mu$m. A 0.5% aqueous solution of the solid polymer A (pH-value 4.0) had a Brookfield viscosity of 745 cP.

Preparation of the non-aqueous dispersion a. The W/O-emulsion (polymer A) was freed from water by the addition of approximately 30% by weight of toluene, based on W/O-emulsion, at 65° C under a weak reduced pressure. Following phase separation in a water separator, the toluene was returned to the distillation vessel until the polymer had a water content of less than 2% by weight.
Polymer dispersion:
Polymer content: 40.1% by weight of Polymer B,
Average particle size: 0.5 $\mu$m
Brookfield viscosity: 8 cP
Brookfield viscosity of a 0.5% aqueous solution of polymer B (pH-value 4.0): 740 cP.

b. The W/O-emulsion (polymer A) was freed from water without the addition of toluene at 60° C and under a pressure of 15 Torr and by continuously returning the volatile organic phase to the distillation vessel until the polymer had a water content of less than 1% by weight. The properties of the dispersion and of polymer C are set out below.
Polymer dispersion:
Polymer content: 41.5% by weight of polymer C,
Average particle size: 0.5 $\mu$m
Brookfield viscosity: 10 cP
Brookfield viscosity of a 0.5% aqueous solution of the polymer (polymer C) (pH-value 4.0): 760 cP

Converting the dispersion into an aqueous solution

15% by weight, based on dispersion, of a liquid mixture of 2 parts of ethoxylated nonyl phenol with 10 ethylene oxide units and 1 parts of decalin are mixed with the polymer dispersion. The dispersion provided with wetting agent and solvent is then introduced into such a quantity of water that 0.017%; 0.003%; 0.007% and 0.01% solutions are formed.

The polymer solutions are used as retention agents in the production of paper. As shown in the following examples of application, the properties of the polymer are not adversely affected by the removal of water. The copolymer produced in accordance with Example 1 remains fully effective as a retention agent in the production of paper after it has been azeotropically freed from water.

Application 1

The degree of fineness according to Schopper-Riegler was determined as a measure of the acceleration in the removal of water in a conventional paper making machine. The greater the extent to which the degree of fineness is reduced by the retention agent added, the greater is the expected acceleration in the removal of water. Mixed waste paper was beaten up in a high-speed stirrer, 1% of aluminium sulphate (based on dry pulp) was added and a pH-value of 4.5 was adjusted by the addition of sulphuric acid.

0.3% solutions of polymers A, B, C according the Example 1 were added to the fibre just before it was introduced into the Schopper-Riegler apparatus.

The following results were obtained, the quantities added being expressed as 100% polymer, based on dry fibre.

| Quantity added | Degree of Fineness according to Schopper-Reigler |
|---|---|
| without retention agent | 55° SR |
| 0.017 % of polymer A | 45° SR |
| 0.017 % of polymer B | 45° SR |
| 0.017 % of polymer C | 44° SR |

Application 2

A paper was produced in a test paper making machine (Kammerer system) from a starting material of 70% of bleached softwood and 30% of bleached hardwood sulphite pulp following the addition of 24% of china clay, 1% of resin glue (sodium abietate) and 3% of aluminium sulphate (based on dry pulp in each case) at pH 4.8. The 0.03% solution of polymer C according to Example 1, heavily diluted with water, was continuously added just before the breast box of the paper making machine. The retention effect was determined by measuring the solids content in the effluent of the paper making machine.

The following Table shows the results, the quantities added being expressed as 100% polymer C according to Example 1, based on dry pulp:

| Quantity added | Solids content of effluent |
|---|---|
| without retention agent | 667 mg/l |
| 0.003% of polymer C | 145 mg/l |
| 0.007% of polymer C | 127 mg/l |
| 0.01% of polymer C | 115 mg/l |

Application 3

In order to demonstrate that the polymer dispersions according to the invention are also highly active under neutral and weakly alkaline conditions, the production conditions for the paper of Application Example 2 were varied as follows:

25% of neutral calcium carbonate were used instead of 25% of china clay, 1% of diketene was added instead of 1% of resin glue and the paper was produced without aluminium sulphate at pH 7.5. Once again, a 0.03% aqueous solution of polymer C according to Example 1 was continuously introduced and the retention effect determined in the same way as in Application Example 2.

| Quantity Added | Solids content of effluent |
|---|---|
| without retention agent | 552 mg/l |
| 0.003% of polymer C | 177 mg/l |
| 0.007% of polymer C | 136 mg/l |
| 0.01% of polymer C | 105 mg/l |

EXAMPLE 2

Preparation of the polymer

Oil phase:
 150 g of decalin
 20 g of sorbitan monooleate
 0.05 g of benzoin isopropyl ether
Aqueous phase:
 100 g of acrylic acid
 80 g of aqueous ammonia (26%); ph value 6.0
Test procedure: as in Example 1
Irradiation time: 20 minutes
Properties of the W/O-emulsion:
 Polymer content: 35% by weight
 Brookfield viscosity: 20 cP
 Average particle size: 0.1 μm
Properties of the polymer:
 Brookfield viscosity of a 0.5% aqueous solution of the polymer (pH 7.0): 630 cP.

The W/O-emulsion was freed from water without the addition of a water-removing agent at 65° C under a weak reduced pressure until the polymer had a water content of less than 1% by weight.
Properties of the polymer dispersion:
 Polymer content: 41% by weight
 Brookfield viscosity: 9 cP
 Average particle size: 0.4 μm
Properties of the polymer:
 Brookfield viscosity of a 0.5% aqueous solution of the polymer (pH-value 7.0) 700 cP.

The addition of 15% by weight of a liquid mixture of 6 parts of 1-decanol and 10 parts of ethoxylated nonyl phenol (15 ethylene oxide units) to the water-free dispersion resulted in the formation of a hydrophilic polyacrylate dispersion which can be converted smoothly and quickly into a 1% aqueous polyarcrylate solution by mixing with water.

EXAMPLE 3

Preparation of the polymer

Oil phase:
 100 g of petroleum ether (bp$_{760}$:110°–140° C)
 50 g of toluene
 30 g of sorbitan monostearate
 6.3 g of methacrylic acid
Aqueous phase:
 93.7 g of acrylamide
 109.2 g of water
 0.05 g of α-propionic acid benzoin ethyl ether (sodium salt).
Polymerisation was carried out under conditions of Example 1.
Test period: 20 minutes
Properties of the W/O-emulsion:
 polymer content: 26.7% by weight
 Brookfield viscosity: 40 cP
 average particle size: 0.2 μm
Properties of the polymer:
 Brookfield viscosity of a 0.5% aqueous solution of the polymer (pH-value 4.0): 290 cP.

Before the removal of water, a liquid mixture of 5 parts of decalin, 15 parts of n-heptane and 10 parts of ethoxylate benzyl oxy diphenyl (15 ethylene oxide units) was added to the W/O-emulsion, followed by the azeotropic removal of water under a weak reduced pressure at 70° C after the addition of 30% by weight of benzene, based on W/O-emulsion.
Properties of the polymer dispersion:
 polymer content: 33% by weight
 Brookfield viscosity: 15 cP
 water content of the polymer: less than 1%
 average particle size: 0.4 μm
Properties of the polymer:
 Brookfield viscosity of a 0.5% aqueous solutin of the polymer (pH-value 5.0): 300 cP.

When mixed with water (1900 g), the polymer dispersion thus prepared (100 g) formed a 5% aqueous solution of the polymer within a matter of seconds.

We claim:

1. A stable, storable, non-aqueous dispersion which is rapidly dilutable with water to form a polymer solution and whose average particle size of the dispersed phase is from 0.01 to 1μ, said dispersion consisting essentially of
   a. at least one water-soluble polymer having an average molecular weight of at least 5,000,000,
   b. a liquid aliphatic or aromatic hydrocarbon selected from the group consisting of toluene, decalin, n-paraffins, iso-paraffins and mixtures thereof and
   c. 5 to 20% by weight, based on the weight of the dispersion, of a water-soluble wetting agent selected from the group consisting of ethoxylated alkyl phenols and ethoxylated aralkyl phenols having from 8 to 20 carbon atoms in the alkyl and aralkyl moieties thereof, said dispersion having been obtained by polymerizing at least one water-soluble α,β-monoolefinically unsaturated monomer in a water-in-oil emulsion by means of at least one photo-initiator and UV light and subsequently removing water from said product of polymerization, either before or after the addition of said water-soluble wetting agent, to a residual water content of less than 5% by weight, based on the weight of the polymer in said dispersion.

* * * * *